(12) United States Patent
Shirata

(10) Patent No.: US 9,748,026 B2
(45) Date of Patent: Aug. 29, 2017

(54) HEXAGONAL FERRITE MAGNETIC POWDER FOR MAGNETIC RECORDING, METHOD FOR PRODUCING HEXAGONAL FERRITE MAGNETIC PARTICLES, AND MAGNETIC RECORDING MEDIUM

(71) Applicant: FUJIFILM Corporation, Tokyo (JP)

(72) Inventor: Masashi Shirata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/757,517

(22) Filed: Dec. 23, 2015

(65) Prior Publication Data

US 2016/0141084 A1 May 19, 2016

Related U.S. Application Data

(63) Continuation of application No. PCT/JP2014/067194, filed on Jun. 27, 2014.

(30) Foreign Application Priority Data

Jun. 28, 2013 (JP) ................. 2013-136838

(51) Int. Cl.
G11B 5/706 (2006.01)
H01F 1/11 (2006.01)

(52) U.S. Cl.
CPC ............ H01F 1/11 (2013.01); G11B 5/70678 (2013.01)

(58) Field of Classification Search
None
See application file for complete search history.

(56) References Cited

U.S. PATENT DOCUMENTS

| 4,539,261 A | * | 9/1985 | Nakata | C09C 1/24 |
| | | | | 427/127 |
| 4,657,816 A | * | 4/1987 | Siddiq | G11B 5/70647 |
| | | | | 252/62.56 |
| 5,124,207 A | * | 6/1992 | Hayashi | G11B 5/70689 |
| | | | | 252/62.58 |
| 5,190,841 A | * | 3/1993 | Saha | H01F 1/11 |
| | | | | 252/62.57 |
| 5,236,783 A | * | 8/1993 | Aoki | G11B 5/70694 |
| | | | | 252/62.56 |
| 5,626,962 A | * | 5/1997 | Yamasaki | G11B 5/70678 |
| | | | | 252/62.64 |
| 6,632,528 B1 | * | 10/2003 | Clough | C23C 30/00 |
| | | | | 428/307.7 |
| 8,545,714 B2 | | 10/2013 | Suzuki et al. | |
| 2003/0072969 A1 | * | 4/2003 | Yamazaki | G11B 5/70678 |
| | | | | 428/844.4 |
| 2005/0074600 A1 | * | 4/2005 | Ma | B82Y 25/00 |
| | | | | 428/328 |
| 2011/0244272 A1 | * | 10/2011 | Suzuki | B82Y 30/00 |
| | | | | 428/842.8 |
| 2012/0177951 A1 | * | 7/2012 | Yamazaki | H01F 1/11 |
| | | | | 428/842.8 |
| 2012/0183811 A1 | * | 7/2012 | Hattori | G11B 5/712 |
| | | | | 428/836 |
| 2014/0011055 A1 | | 1/2014 | Suzuki et al. | |
| 2014/0255728 A1 | * | 9/2014 | Shirata | G11B 5/70678 |
| | | | | 428/842.3 |

FOREIGN PATENT DOCUMENTS

| JP | 2011-225417 A | 11/2011 |
| JP | 2012-156438 A | 8/2012 |
| JP | 2012-164410 A | 8/2012 |

OTHER PUBLICATIONS

International Preliminary Report on Patentability issued from the International Bureau in counterpart International Application No. PCT/JP2014/067194, issued on Jan. 7, 2016.
International Search Report for PCT/JP2014/067194 dated Sep. 22, 2014.
Written Opinion for PCT/JP2014/067194 dated Sep. 22, 2014.

* cited by examiner

Primary Examiner — Kevin Bernatz
(74) Attorney, Agent, or Firm — Sughrue Mion, PLLC

(57) ABSTRACT

Provided are hexagonal ferrite magnetic powder for magnetic recording, being comprised of hexagonal ferrite magnetic particles having a crystalline metal oxide adhered to a surface thereof, a method for producing hexagonal ferrite magnetic particles having a crystalline metal oxide adhered to a surface thereof, and a magnetic recording medium.

8 Claims, 1 Drawing Sheet

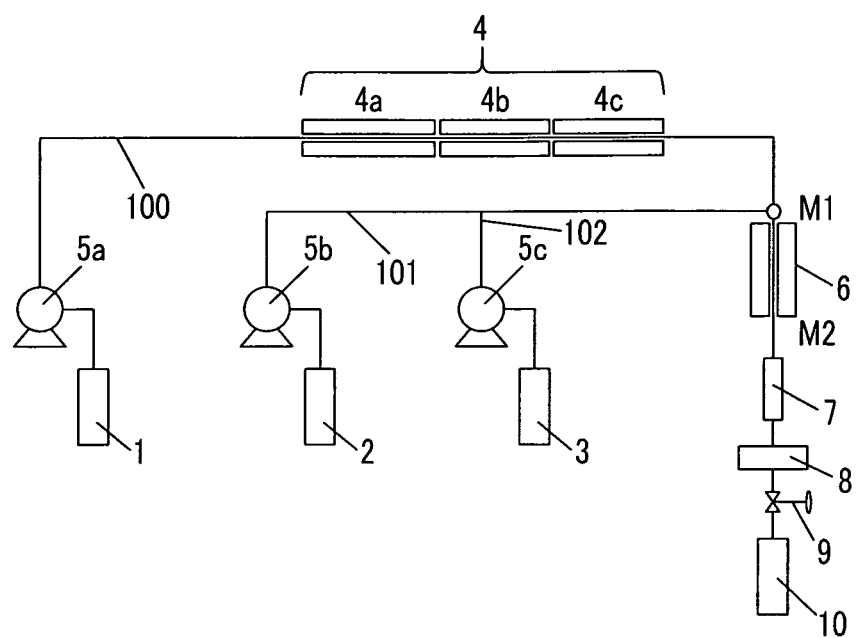

HEXAGONAL FERRITE MAGNETIC POWDER FOR MAGNETIC RECORDING, METHOD FOR PRODUCING HEXAGONAL FERRITE MAGNETIC PARTICLES, AND MAGNETIC RECORDING MEDIUM

CROSS-REFERENCE TO RELATED APPLICATIONS

This application is a Continuation of PCT International Application No. PCT/JP2014/067194 filed on Jun. 27, 2014, which claims priority under 35 U.S.C §119(a) to Japanese Patent Application No. 2013-136838 filed on Jun. 28, 2013. Each of the above applications is hereby expressly incorporated by reference, in its entirety.

BACKGROUND OF THE INVENTION

1. Field of the Invention

The present invention relates to hexagonal ferrite magnetic powder for magnetic recording and specifically to hexagonal ferrite magnetic powder for magnetic recording which is preferable as coating-type magnetic powder for a magnetic recording medium having high coated film durability.

Furthermore, the present invention relates to a method for producing hexagonal ferrite magnetic particles preferable for the production of the above-described magnetic powder and a magnetic recording medium having a magnetic layer including the magnetic powder.

2. Description of the Related Art

In the related art, for a magnetic layer in a magnetic recording medium for high-density recording, ferromagnetic metal particles have been mainly used. Ferromagnetic metal particles are acicular particles mainly containing iron, and, for high-density recording, a decrease in the size of the particles and an increase in the coercive force thereof have been pursued. Ferromagnetic metal particles have been used for magnetic recording media in a variety of uses.

Due to the increasing amount of information recorded, a magnetic recording medium always requires high-density recording. However, in terms of higher-density recording, a barrier begins to appear in the improvement of ferromagnetic metal particles. In contrast, hexagonal ferrite magnetic particles have a coercive force great enough to be used as a material for a permanent magnet and are capable of maintaining a high coercive force even when the particles are miniaturized since magnetic anisotropy which is a basis of the coercive force is derived from the crystal structure. Furthermore, a magnetic recording medium in which hexagonal ferrite magnetic particles are used for a magnetic layer has excellent high density characteristics due to a perpendicular component thereof. As described above, hexagonal ferrite magnetic particles are ferromagnetic bodies suitable for increasing the density.

In recent years, in order to further improve the above-described hexagonal ferrite magnetic particles having excellent characteristics, provision of a metal such as Al to particle surfaces of hexagonal ferrite has been proposed (for example, refer to JP2011-225417A).

SUMMARY OF THE INVENTION

JP2011-225417A discloses that, in the production of hexagonal ferrite magnetic particles using a glass crystallization method, when a raw material mixture including Al is used, hexagonal ferrite magnetic particles including Al uniformly applied to the surface are obtained. In JP2011-225417A, hexagonal ferrite magnetic particles obtained using the above-described production method are used, and therefore it is possible to obtain a magnetic recording medium which does not significantly wear a dispersion medium when being dispersed and has an output dropped only to a slight extent and a head worn only slightly.

However, a magnetic recording medium, particularly, a high-density recording medium such as backup tape, is required to be capable of being used for a long period of time with high reliability. In order for a magnetic recording medium to be used for a long period of time with high reliability, the magnetic recording medium desirably has high coated film durability so that a magnetic layer is not significantly cut off due to sliding on the head when a record is played. According to the present inventors' studies, regarding the above-described point, hexagonal ferrite magnetic particles obtained using the production method described in JP2011-225417A were not enough to form a magnetic layer having high coated film durability.

Therefore, an object of the present invention is to provide hexagonal ferrite magnetic particles for magnetic recording preferable for the production of a magnetic recording medium having high coated film durability.

The present inventors repeated studies regarding hexagonal ferrite magnetic particles obtained using the production method described in JP2011-225417A in order to achieve the above-described object and, consequently, inferred that the poor coated film durability of a magnetic recording medium obtained using the hexagonal ferrite magnetic particles is attributed to the fact that an Al compound adhered to the surfaces of the hexagonal ferrite magnetic particles obtained using the above-described production method is a hydroxide (aluminum hydroxide) or amorphous aluminum oxide. In the production method described in JP2011-225417A, it is considered that the Al compound adhered to particle surfaces is present in a form of a hydroxide or an amorphous oxide because some of Al is dissolved and adhered again to particle surfaces in an acid treatment or a cleaning step in the glass crystallization method.

Therefore, the present inventors additionally repeated studies on the basis of the above-described finding and, consequently, newly found that, when a crystalline metal oxide is adhered to the surfaces of hexagonal ferrite magnetic particles, a magnetic recording medium formed using the particles has high coated film durability. Furthermore, the present inventors also newly found that hexagonal ferrite magnetic particles having a crystalline metal oxide adhered to a surface thereof can be obtained using a continuous hydrothermal synthesis process (also referred to as "supercritical synthesis method").

The present invention has been completed on the basis of the above-described finding.

An aspect of the present invention relates to hexagonal ferrite magnetic powder for magnetic recording, being comprised of hexagonal ferrite magnetic particles having a crystalline metal oxide adhered to a surface thereof.

In one aspect, in the hexagonal ferrite magnetic powder for magnetic recording, an activation volume is in a range of 800 $nm^3$ to 1600 $nm^3$.

In one aspect, the crystalline metal oxide is a crystalline oxide of a metal selected from the group consisting of Al, Zr, and Ce.

In one aspect, the hexagonal ferrite magnetic particles are hexagonal ferrite magnetic particles having a crystalline metal oxide adhered to the surface thereof in which the amount of the metal falls within a range of 0.5 atom % to 20 atom % with respect to 100 atom % of Fe.

In one aspect, the hexagonal ferrite magnetic particles are barium ferrite magnetic particles. In another aspect, the hexagonal ferrite magnetic particles are strontium ferrite magnetic particles.

Another aspect of the present invention relates to a method for producing hexagonal ferrite magnetic particles having a crystalline metal oxide adhered to a surface thereof, including: heating and pressurizing a water-based solution including the hexagonal ferrite magnetic particles and a crystalline metal oxide precursor, thereby precipitating a crystalline metal oxide converted from the precursor on surfaces of the hexagonal ferrite magnetic particles.

In one aspect, the heating and pressurization is carried out by continuously feeding the water-based solution to a reaction flow path in which a liquid flowing in the reaction flow path is heated at 350° C. or higher and is pressurized by applying a pressure of 20 MPa or higher.

In one aspect, a crystalline metal oxide converted from the precursor is precipitated on the surfaces of the hexagonal ferrite magnetic particles by adding the water-based solution to a liquid-feeding path into which water heated at 350° C. or higher and pressurized at a pressure of 20 MPa or higher is continuously fed and continuously feeding a liquid mixture of the water and the water-based solution while being heated at 350° C. or higher and pressurized at a pressure of 20 MPa or higher.

In one aspect, the above-described production method further includes preparing the water-based solution by mixing an aqueous solution including hexagonal ferrite magnetic particles and the crystalline metal oxide precursor with an organic modifier solution including an organic modifier in an organic solvent.

In one aspect, the above-described production method further includes producing the hexagonal ferrite magnetic particles using a glass crystallization method.

In one aspect, the above-described production method further includes producing the hexagonal ferrite magnetic particles by precipitating hexagonal ferrite precursor particles by mixing an iron salt and an alkaline-earth metal salt in a basic aqueous solution, mixing an aqueous solution including the precipitated hexagonal ferrite precursor particles with an organic modifier solution including an organic modifier in an organic solvent, adding the water-based solution obtained through the above-described mixing to a liquid-feeding path into which water heated at 350° C. or higher and pressurized at a pressure of 20 MPa or higher is continuously fed, and continuously feeding a liquid mixture of the water and the water-based solution in the liquid-feeding path while being heated at 350° C. or higher and pressurized at a pressure of 20 MPa or higher, thereby converting the hexagonal ferrite precursor particles to hexagonal ferrite particles.

In one aspect, the hexagonal ferrite magnetic powder for magnetic recording is produced using the above-described production method.

Still another aspect of the present invention relates to a magnetic recording medium having a magnetic layer including ferromagnetic powder and a binder on a non-magnetic support body, in which the ferromagnetic powder is the hexagonal ferrite magnetic powder for magnetic recording.

According to the present invention, it is possible to provide a magnetic recording medium having high coated film durability. Furthermore, when a fine particulate magnetic body is used as hexagonal ferrite magnetic powder for magnetic recording, it also becomes possible to provide a magnetic recording medium which has high coated film durability and excellent electromagnetic conversion characteristics and is preferable as a medium for high-density recording.

BRIEF DESCRIPTION OF THE DRAWINGS

FIG. 1 is a schematic explanatory view of a production apparatus preferable for a continuous hydrothermal synthesis process (supercritical synthesis method).

DESCRIPTION OF THE PREFERRED EMBODIMENTS

[Hexagonal Ferrite Magnetic Powder for Magnetic Recording and Method for Producing Hexagonal Ferrite Magnetic Particles]

An aspect of the present invention relates to hexagonal ferrite magnetic powder for magnetic recording, being comprised of hexagonal ferrite magnetic particles having a crystalline metal oxide adhered to a surface thereof.

While it is not clear why hexagonal ferrite magnetic powder having a crystalline metal oxide adhered to a surface thereof enables provision of a magnetic recording medium having high coated film durability, the present inventors infer that hexagonal ferrite having a crystalline metal oxide adhered to a surface thereof falls into a state in which hydroxyl groups are regularly arranged on particle surfaces and becomes easily adsorbed to a binder, whereby a magnetic recording medium having high coated film durability can be provided. Meanwhile, the crystalline metal oxide refers to an oxide that is different from hexagonal ferrite in terms of composition, crystal structure, or both composition and crystal structure.

In the present invention, the crystalline metal oxide refers to an oxide, at least, having one or more diffraction patterns belonging to each oxide at a diffraction angle of 10° or higher in an X-ray diffraction analysis or having one or more spot patterns in electron beam diffraction. Preferably, whether or not an oxide is crystalline is determined in an X-ray diffraction analysis. In addition, having a diffraction pattern or a spot pattern means that the ratio of the maximum peak intensity of the crystalline metal oxide to the maximum peak intensity of the hexagonal ferrite is $1/1000$ or higher.

For a specimen present in a powder form, it is possible to confirm whether or not the crystalline metal oxide is adhered to a surface of the powder by subjecting the powder to an X-ray diffraction analysis or an electron beam analysis.

Meanwhile, for magnetic powder included in a magnetic layer of a magnetic recording medium, it is possible to obtain a measurement specimen by extracting magnetic powder from the magnetic layer. For example, the magnetic layer is peeled off from the magnetic recording medium, 0.1 ml to 100 ml of n-butylamine is added to 100 mg to 500 mg of the magnetic layer, and the magnetic layer is sealed in a glass tube, is set in a pyrolysis device, and is heated at 100° C. for approximately three days. After cooling, the magnetic layer is removed from the glass tube and is centrifugally separated, thereby separating a liquid and a solid content. The separated solid content is washed with acetone, thereby obtaining a powder specimen for an X-ray analysis. Since heating at approximately 100° C. or immersion in an organic solvent barely causes damage to an oxide, it is possible to evaluate the crystallinity of the metal oxide adhered to the particle surface.

In addition, in an electron beam diffraction analysis, a measurement specimen sampled from the magnetic layer as described above may be used, or is it also possible to check a pattern belonging to each oxide among spot patterns of hexagonal ferrite by irradiating the medium with electron beams from the magnetic layer side.

Hereinafter, hexagonal ferrite magnetic powder for magnetic recording according to the aspect of the present invention (hereinafter, also referred to as "hexagonal ferrite magnetic powder" or "magnetic powder") will be described in more detail.

The above-described hexagonal ferrite magnetic powder can be obtained by carrying out a treatment for adhering a crystalline metal oxide to hexagonal ferrite magnetic particles. Details of the adhering treatment will be described below. Hexagonal ferrite magnetic particles to which a crystalline metal oxide is adhered (hereinafter, also referred to as "raw material hexagonal ferrite magnetic particles" or "raw material particles") are not particularly limited as the raw material hexagonal ferrite magnetic particles, and hexagonal ferrite magnetic particles obtained using a well-known method, for example, a co-precipitation method, a reverse-micelle method, a hydrothermal synthesis method, a glass crystallization method, or the like or commercially available hexagonal ferrite magnetic particles can be used. As a method for producing hexagonal ferrite for magnetic recording, the glass crystallization method is said to be excellent since magnetic powder having fine particle adequacy and single particle dispersion adequacy desirable for a magnetic recording medium can be obtained and the particle size distribution is narrow. Therefore, in the aspect of the present invention, the raw material particles are preferably produced using the glass crystallization method. A method for producing hexagonal ferrite magnetic powder using the glass crystallization method is generally made up of the following steps.

(1) A step of obtaining a molten substance by melting a raw material mixture including a hexagonal ferrite-forming component (arbitrarily including a coercive force-adjusting component) and a glass-forming component (melting step);

(2) A step of obtaining an amorphous body by quenching the molten substance (amorphization step);

(3) A step of precipitating hexagonal ferrite particles by heating the amorphous body (crystallization step); and (4) A step of collecting hexagonal ferrite magnetic particles precipitated from the heated body (particle collection step).

Regarding the details of the above-described steps, for example, Paragraphs "0018" to "0035" of JP2011-213544A, Paragraphs "0013" to "0024" of JP2011-225417A, and the like can be referred to.

In addition, it is also possible to obtain the raw material particles using a synthesis method using a continuous hydrothermal process which has been proposed as a method for synthesizing nanoparticles in the recent years. In this synthesis method, a water-based fluid including hexagonal ferrite precursor particles is heated and pressurized while being fed into a reaction flow path, whereby the strong reactivity of water in a subcritical to supercritical state is used, and hexagonal ferrite precursor particles are converted to ferrite. Hereinafter, a specific aspect of the synthesis method will be described.

The hexagonal ferrite precursor particles can be obtained by mixing an iron salt and an alkaline-earth metal salt in a basic aqueous solution. In the basic aqueous solution, generally, a salt containing iron and an alkaline-earth metal is precipitated in a particle form, preferably, in a colloidal particle form. Here, the precipitated particles turn into ferrite when, later, being placed in the presence of water in a subcritical to supercritical state and turn into hexagonal ferrite magnetic particles.

As the alkaline-earth metal salt, an alkaline-earth metal salt such as barium, strontium, calcium, or lead can be used. The type of an alkaline-earth metal may be determined depending on desired hexagonal ferrite. For example, in a case in which it is necessary to obtain barium ferrite, a barium salt is used as the alkaline-earth metal salt, and, in a case in which it is necessary to obtain strontium ferrite, a strontium salt is used. The salt is preferably a water-soluble salt, and, for example, a halide such as a hydroxide, a chloride, a bromide, or an iodide, nitrate, and the like can be used.

As the iron salt, it is possible to use a water-soluble salt of iron, for example, a halide such as a chloride, a bromide, or an iodide, nitrate, sulfate, carbonate, an organic acid salt, a complex salt, or the like. The mixing ratio between the iron salt and the alkaline-earth metal salt may be determined depending on a desired ferrite composition. In addition, in addition to the iron salt and the alkaline-earth metal salt, a salt of an arbitrary element capable of constituting hexagonal ferrite together with iron and an alkaline-earth metal may be added to the basic aqueous solution. Examples of the above-described arbitrary element include Nb, Co, Ti, Zn, and the like. The added amount of the salt of the arbitrary element may also be determined depending on a desired ferrite composition.

When the above-described salts are mixed together in the basic aqueous solution, particles including elements contained in the salts (hexagonal ferrite precursor particles) are precipitated. Here, the precipitated particles subsequently turn into ferrite and are converted to hexagonal ferrite. Examples of a base included in the basic aqueous solution include sodium hydroxide, potassium hydroxide, sodium carbonate, ammonia water, and the like. The amount of the base used in the aqueous solution is preferably in a range of approximately 0.1 times to 10 times and more preferably in a range of approximately 0.2 times to 8 times the total amount of the salts added to the aqueous solution. There is a tendency that, as the concentration of the base increases, the sizes of precipitated particles decrease.

Next, when the aqueous solution including the hexagonal ferrite precursor particles is heated and pressurized, and included water is put into a subcritical to supercritical state, a reaction of converting a hexagonal ferrite precursor to ferrite (ferritization) proceeds in the particles, and consequently, hexagonal ferrite particles can be obtained. Generally, when a fluid including water as a solvent is heated at 350° C. or higher and is pressurized at a pressure of 20 MPa or higher, water included in the fluid falls into a subcritical to supercritical state.

Examples of a specific aspect of a step of converting the hexagonal ferrite precursor particles to hexagonal ferrite include the following aspects.

(1) The aqueous solution including the hexagonal ferrite precursor particles is continuously fed into a reaction flow path in which a fluid flowing in the reaction flow path is heated at 350° C. or higher and is pressurized by applying a pressure of 20 MPa or higher to the fluid, thereby converting the hexagonal ferrite precursor particles to hexagonal ferrite in the reaction flow path.

(2) The aqueous solution including the hexagonal ferrite precursor particles is added to a liquid-feeding path into which water heated at 350° C. or higher and pressurized at a pressure of 20 MPa or higher is continuously fed, and a liquid mixture of the water and the aqueous solution including the hexagonal ferrite precursor particles is continuously fed into the liquid-feeding path while being heated at 350° C. or higher and pressurized at a pressure of 20 MPa or higher, thereby converting the hexagonal ferrite precursor particles to hexagonal ferrite.

The aspect (2) is different from the aspect (1) since the water in a subcritical to supercritical state and the aqueous solution including the hexagonal ferrite precursor particles are brought into contact with each other while the aqueous solution including the hexagonal ferrite precursor particles is heated and pressurized in order to put the aqueous solution into a subcritical to supercritical state in the aspect (1). In the aspect (2), since the aqueous solution is brought into contact with the water in a subcritical to supercritical state, the hexagonal ferrite precursor particles are instantly put into a highly reactive state and thus turn into ferrite in an early stage, which is advantageous.

Meanwhile, it is effective means to treat the hexagonal ferrite magnetic particles using an organic modifier since, then, aggregation between the particles is prevented. In an aspect, the above-descried organic modifier can be added to the reaction system after initiation of the ferritization as described in, for example, JP2009-208969A.

In addition, in another aspect, the organic modifier can be added to a water-based solution including the hexagonal ferrite magnetic particles and a crystalline metal oxide precursor, which will be described below, before heating and pressurizing the water-based solution. Details thereof will be described below.

Furthermore, in still another aspect, the organic modifier is added to an aqueous solution including the hexagonal ferrite precursor particles, and then is subjected to the step of the aspect (1) or (2). In such a case, the organic modifier can be adhered to the hexagonal ferrite precursor particles, and thus aggregation of the particles can be more effectively prevented, and extremely fine hexagonal ferrite magnetic particles can be obtained.

Examples of the organic modifier include organic carboxylic acids, organic nitrogen compounds, organic sulfur compounds, organic phosphorus compounds, and the like.

Examples of the organic carboxylic acids include aliphatic carboxylic acids, alicyclic carboxylic acids, aromatic carboxylic acids, and the like, and aliphatic carboxylic acids are preferred. The aliphatic carboxylic acid may be either a saturated aliphatic carboxylic acid or an unsaturated aliphatic carboxylic acid, but is preferably an unsaturated carboxylic acid. The number of carbon atoms in the carboxylic acids is not particularly limited and is, for example, in a range of 2 to 24, preferably in a range of 5 to 20, and more preferably in a range of 8 to 16. Specific examples of the aliphatic carboxylic acid include oleic acid, linoleic acid, linolenic acid, caprylic acid, capric acid, lauric acid, behenic acid, stearic acid, myristic acid, palmitic acid, myristoleic acid, palmitoleic acid, vaccenic acid, eicosenoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, nonadecanoic acid, icosanoic acid, and the like, and the aliphatic carboxylic acid is not limited thereto.

Examples of the organic nitrogen compounds include organic amines, organic amide compounds, nitrogen-containing heterocyclic compounds, and the like.

The organic amines may be any of primary amines, secondary amines, and tertiary amines and are preferably primary amines and secondary amines. Examples thereof include aliphatic amines such as primary aliphatic amines and secondary aliphatic amines. The number of carbon atoms in the amines is not particularly limited and is, for example, in a range of 5 to 24, preferably in a range of 8 to 20, and more preferably in a range of 12 to 18. Specific examples of the organic amines include alkylamines such as oleylamine, laurylamine, myristylamine, palmitylamine, stearylamine, octylamine, decylamine, dodecylamine, tetradecylamine, hexadecylamine, octadecylamine, and dioctylamine, aromatic amine such as aniline, hydroxyl group-containing amines such as methylethanolamine and diethanolamine, furthermore, derivatives thereof, and the like.

Examples of the nitrogen-containing heterocyclic compounds include heterocyclic compounds having a saturated or unsaturated three- to seven-membered ring having 1 to 4 nitrogen atoms. The heterocyclic compounds may have a sulfur atom, an oxygen atom, or the like as a hetero atom. Specific examples thereof include pyridine, lutidine, corydine, quinolines, and the like.

Examples of the organic sulfur compounds include organic sulfides, organic sulfoxides, sulfur-containing heterocyclic compounds, and the like. Specific examples thereof include dialkyl sulfides such as dibutyl sulfide, dialkyl sulfoxides such as dimethyl sulfoxide and dibutyl sulfoxide, sulfur-containing heterocyclic compounds such as thiophene, thiolane, and thiomorpholine, and the like.

Examples of the organic phosphorus compounds include phosphoric acid esters, phosphines, phosphine oxides, trialkyl phosphines, phosphorous acid esters, phosphonic acid esters, phosphonous acid esters, phosphinic acid esters, phosphinous acid esters, and the like. Examples thereof include trialkyl phosphines such as tributylphosphine, trihexylphosphine, and trioctylphosphine, trialkylphosphine oxides such as tributylphosphine oxide, trihexylphosphine oxide, trioctylphosphine oxide (TOPO), and tridecylphosphine oxide, and the like.

The amount of the organic modifier mixed with 100 parts by mass of the hexagonal ferrite precursor particles is preferably in a range of approximately 1 part by mass to 1000 parts by mass. In such a case, it is possible to more effectively suppress aggregation of the particles. The organic modifier may be added to the aqueous solution including the hexagonal ferrite precursor particles without any changes, but the organic modifier is preferably added thereto in a state of being included in an organic solvent (an organic modifier solution) since, then, fine hexagonal ferrite magnetic particles are obtained. The organic solvent is preferably a solvent miscible with water or a hydrophilic solvent. Therefore, a polar solvent is preferably used. Here, the polar solvent refers to a solvent satisfying at least one of the requirements of a permittivity of 15 or higher and a dissolution parameter of 8 or higher. Examples of a preferred organic solvent include alcohols, ketones, aldehydes, nitriles, lactams, oximes, amides, urea, amines, sulfides, sulfoxides, phosphorus acid esters, carboxylic acids, esters that are carboxylic acid derivatives, carbonic acid, carbonic acid esters, ethers, and the like.

Examples of the alcohols include methanol, ethanol, propanol, isopropanol, butanol, pentanol, cyclopentanol, hexanol, cyclohexanol, heptanol, cycloheptanol, octanol, cyclooctanol, nonanol, decanol, dodecanol, tridecanol, tetradecanol, heptadecanol, cycloheptanol, methoxyethanol, chloroethanol, trifluoroethanol, hexafluoropropanol, phenol, benzyl alcohol, ethylene glycol, triethylene glycol, and the like.

Examples of the ketones or the aldehydes include acetone, 2-butanone, 3-pentanone, diethyl ketone, methyl ethyl ketone, methyl propyl ketone, butyl methyl ketone, cyclohexanone, acetophenone, and the like.

Examples of the nitriles include acetonitrile, benzonitrile, and the like.

Examples of the lactams include s-caprolactam and the like.

Examples of the oximes include cyclohexanone oxime and the like.

Examples of the amides or the urea include formamide, N-methylformamide, N,N-dimethylformamide (DMF), N,N'-dimethylacetamide, pyrrolidone, N-methylpyrrolidone, N,N'-dimethyl ethylene urea, N,N'-dimethyl propylene urea, N,N-dimethylformamide, tetrahydrofuran, and the like.

Examples of the amines include quinoline, triethylamine, tributylamine, and the like.

Examples of the sulfoxides include sulforane and the like.

Examples of the phosphorus acid esters include hexamethylene phosphoric acid, and the like.

Examples of the carboxylic acids or the esters include ethyl acetate, methyl acetate, formic acid, acetic acid, dimethyl carbonate, diethyl carbonate, propylene carbonate, and the like.

Examples of the ethers include diglyme, diethyl ether, anisole, and the like.

Hitherto, examples of the organic solvent available for preparation of the organic modifier solution have been listed, but the organic solvent is not limited thereto.

From the viewpoint of obtaining fine hexagonal ferrite magnetic particles or hexagonal ferrite magnetic particles having a narrow particle size distribution, the organic modifier solution is preferably added to the aqueous solution so that the ratio of water to the organic solvent in a mixed solution obtained by mixing the organic modifier solution and the aqueous solution including the hexagonal ferrite precursor particles falls in a range of 0.2 to 0.8 in terms of the volume-based ratio of water to (water and the organic solvent) and more preferably added to the aqueous solution so that the ratio falls in a range of 0.25 to 0.75. In addition, from the viewpoint of obtaining fine hexagonal ferrite magnetic particles or hexagonal ferrite magnetic particles having a narrow particle size distribution, the pH of the mixed solution preferably falls in a range of 4 to 14 and more preferably falls in a range of 7 to 13 in terms of the value at a liquid temperature of 25° C. Therefore, it is possible to arbitrarily determine, in order for adjustment of the pH, to add an acid or a base to either or both the aqueous solution including the hexagonal ferrite precursor particles and the organic modifier solution or to the mixed solution obtained by mixing both solutions together. As the acid and the base used for adjustment of the pH, any acid or base can be used without any limitations as long as the acid or base is generally used for adjustment of pH.

The organic modifier solution and the aqueous solution including the hexagonal ferrite precursor particles may be mixed together by batch or continuously, but are preferably mixed together continuously in order to improve productivity by continuously carrying out the mixing and a step of heating and pressurizing a reaction system in order to put water, which will be included in the system later, into a subcritical to supercritical state. FIG. 1 is a schematic explanatory view of a production apparatus preferable for the continuous hydrothermal synthesis process.

The production apparatus illustrated in FIG. 1 includes liquid tanks 1, 2, and 3, heating means 4 (4a to 4c), pressurization and liquid-feeding means 5a, 5b, and 5c, a reactor 6, a cooling section 7, filtration means 8, a pressure adjustment valve 9, and a collection section 10, and fluids are fed into pipes 100, 101, and 102 from the respective liquid tanks.

In one aspect, water such as purified water or distilled water is introduced into the liquid tank 1, the aqueous solution including the hexagonal ferrite precursor particles is introduced into the liquid tank 2, and the organic modifier solution is introduced into the liquid tank 3. The water introduced into the liquid tank 1 is fed into the pipe 100 while being pressurized using the pressurization and liquid-feeding means 5a and is heated using the heating means 4, thereby turning into water in a subcritical to supercritical state and reaching a mixing section M1.

Meanwhile, the aqueous solution including the hexagonal ferrite precursor particles fed into the pipe 101 from the liquid tank 2 using the pressurization and liquid-feeding means 5b joins with the organic modifier solution fed into the pipe 102 from the liquid tank 3 using the pressurization and liquid-feeding means 5b and then reaches the mixing section M1.

Preferably, before reaching the mixing section M1, the organic modifier is adhered to the surfaces of the hexagonal ferrite precursor particles. When the organic modifier is adhered to the hexagonal ferrite precursor particles before being brought into contact with water in a subcritical to supercritical state as described above, fine hexagonal ferrite particles are obtained, which is advantageous. In order to adhere the organic modifier to the hexagonal ferrite precursor particles before bringing the organic modifier into contact with water, as the organic solvent for the organic modifier solution, the above-described solvent miscible with water or hydrophilic solvent is preferably used.

Next, when the aqueous solution including the hexagonal ferrite precursor particles is brought into contact with water in a subcritical to supercritical state in the mixing section M1, the ferritization of the precursor initiates. After that, subsequently, the aqueous solution including the hexagonal ferrite precursor particles is heated in the reactor and, furthermore, is pressurized using the pressurization means 5a, whereby water included in the reaction system inside the reactor 6 falls into a subcritical to supercritical state, and the ferritization of the precursor further proceeds. After that, a solution including hexagonal ferrite magnetic particles formed by conversion of the hexagonal ferrite precursor particles to ferrite is discharged through an outlet M2. The discharged solution is mixed with cold water in the cooling section 7 so as to be cooled, and then the hexagonal ferrite magnetic particles are collected using the filtration means (filter or the like) 8. The hexagonal ferrite magnetic particles collected using the filtration means 8 are discharged from the filtration means 8, pass through the pressure adjustment valve 9, and are collected in the collection section 10.

In the above-described method, since a pressure is applied to the fluid fed into the apparatus, a high pressure-resistant metal pipe is preferably used as the pipes. A metal constituting the pipes is preferably stainless steel such as SUS316 or SUS304 or a nickel-based alloy such as INCONEL (registered trademark) or HASTELLOY (registered trademark) in terms of low corrosion resistance. However, the metal is not limited thereto, and equivalent or similar materials can also be used. In addition, the laminate-structured pipe described in JP2010-104928A may be used.

Meanwhile, in the production apparatus illustrated in FIG. 1, the water in a subcritical to supercritical state and the water-based solution including the hexagonal ferrite precursor particles are mixed together in the mixing section M1 at which the pipes are joined together using a T-type joint, but the reactor and the like described in JP2007-268503A, JP2008-12453A, and JP2010-75914A may be used. A material of the reactor is preferably the material described in JP2007-268503A, JP2008-12453A, and JP2010-75914A. Specifically, as a preferable metal constituting the pipe, the above-described metal is preferably used. However, the metal is not limited thereto, and equivalent or similar materials can also be used. In addition, the metal may be combined with a titanium alloy, a tantalum alloy, a ceramic, or the like which is corrosion-resistant.

In the above description, a step of obtaining hexagonal ferrite magnetic particles modified with the organic modifier by adding the organic modifier to the aqueous solution including the hexagonal ferrite precursor particles and then subjecting the mixture to the step of the above-described aspect (2) has been described, but it is certainly possible to add the organic modifier to the aqueous solution including the hexagonal ferrite precursor particles and then subject the mixture to the step of the above-described aspect (1).

When a reaction system including water is heated at 350° C. or higher and is pressurized by applying a pressure of 20 MPa or higher, water falls into a subcritical to supercritical state, and an extremely highly reactive reaction field is produced. When hexagonal ferrite precursor particles are put under this state, ferritization proceeds rapidly, and hexagonal ferrite magnetic particles can be obtained. The heating temperature may be a temperature at which the inside of the reaction system reaches 350° C. or higher and is preferably in a range of 350° C. to 500° C. Meanwhile, the pressure applied to the reaction system is 20 MPa or higher as described above, and is preferably in a range of 20 MPa to 50 MPa.

The hexagonal ferrite magnetic powder for magnetic recording according to an aspect of the present invention is made of hexagonal ferrite magnetic particles having a crystalline metal oxide adhered to a surface thereof, but a method for adhering the crystalline metal oxide to the hexagonal ferrite magnetic particles is not particularly limited. No matter what method is used, as long as a metal oxide is adhered as a crystalline substance to the surfaces of the hexagonal ferrite magnetic particles, the hexagonal ferrite magnetic particles are considered to be included in the scope of the aspect of the present invention.

In one aspect, when hexagonal ferrite magnetic particles having a metal hydroxide or an amorphous metal oxide adhered to a surface thereof are heated, it is possible to convert the adhered substance to a crystalline metal oxide. For example, when the particles are heated in the atmosphere at a high temperature in a range of approximately 400° C. to 500° C., the adhered substance can be converted to a crystalline metal oxide. However, in this means, there are cases in which the particles are sintered during heating, and the obtained particles are coarsened and become unsuitable for high-density recording or the metal diffuses into the lattices of hexagonal ferrite during heating, and a crystalline metal oxide cannot be obtained.

In contrast, the present inventors newly found that, when the above-described hydrothermal synthesis process is used, fine hexagonal ferrite magnetic particles having a crystalline metal oxide adhered to a surface thereof can be obtained. Therefore, in the aspect of the present invention, the crystalline metal oxide is preferably adhered to the hexagonal ferrite magnetic particles using the hydrothermal synthesis process.

That is, according to an aspect of the present invention, a method for producing hexagonal ferrite magnetic particles having a crystalline metal oxide adhered to a surface thereof, including: heating and pressurizing a water-based solution including the hexagonal ferrite magnetic particles and a crystalline metal oxide precursor, thereby precipitating a crystalline metal oxide converted from the precursor on surfaces of the hexagonal ferrite magnetic particles is provided.

Hereinafter, the above-described production method will be described in more detail.

When a water-based solution including hexagonal ferrite magnetic particles and a crystalline metal oxide precursor is heated and pressurized, it is possible to convert the precursor to a crystalline metal oxide and educe the crystalline metal oxide on the surfaces of the hexagonal ferrite magnetic particles. In order to cause a reaction for converting the precursor to a crystalline metal oxide to favorably proceed, the heating and pressurization is preferably carried out at a temperature and a pressure at which water falls into a subcritical to supercritical state. As described above, when a reaction system including water is heated at 350° C. or higher and is pressurized by applying a pressure of 20 MPa or higher, water falls into a subcritical to supercritical state. Therefore, a water-based solution including hexagonal ferrite magnetic particles and a crystalline metal oxide precursor is preferably heated at 350° C. or higher and is pressurized by applying a pressure of 20 MPa or higher. More preferably, the heating temperature is in a range of 350° C. to 500° C., and the pressure applied to a reaction system is in a range of 20 MPa to 50 MPa.

The reaction may be performed by batch or continuously. From the viewpoint of improving productivity, the reaction is preferably performed continuously, and more preferably performed by continuously feeding the above-described water-based solution to a reaction flow path in which a liquid flowing in the reaction flow path is heated at 350° C. or higher and is pressurized by applying a pressure of 20 MPa or higher. An example of an apparatus preferable for performing the reaction is the production apparatus previously illustrated in FIG. 1.

Hereinafter, an aspect of obtaining hexagonal ferrite magnetic particles having a crystalline metal oxide adhered to a surface thereof using the production apparatus illustrated in FIG. 1 will be described.

In FIG. 1, as described above, water is introduced into the liquid tank 1. Meanwhile, a solution including hexagonal ferrite magnetic particles and a crystalline metal oxide precursor is introduced into the liquid tank 2. Examples of a solvent used for the solution include water and a solvent mixture of water and an organic solvent. Examples of the organic solvent include a variety of the above-described solvents miscible with water or hydrophilic solvents. From the viewpoint of causing the reaction to favorably proceed, water is preferably used.

As the crystalline metal oxide precursor, it is possible to use a variety of metal compounds that can be converted to a crystalline metal oxide by being heated and pressurized, preferably, by being brought into contact with water in a subcritical to supercritical state. Examples of the metal include a variety of metals such as alkali metals, alkaline-earth metals, transition metals, and rare earth elements, and, from the viewpoint of further improving coated film durability, Al, Zr, and Ce are preferred.

Examples of the crystalline metal oxide precursor include metal salts such as nitrate, sulfate, and acetate, hydrates thereof, metal alkoxides, and the like, and highly water-soluble metal salts or hydrates are preferably used.

From the viewpoint of further improving coated film durability, the amount of the crystalline metal oxide adhered to the surfaces of the hexagonal ferrite magnetic particles is preferably an amount at which the ratio of the metal to 100 atom % of Fe constituting hexagonal ferrite (metal/Fe ratio) reaches 0.5 atom % or higher and more preferably an amount at which the metal/Fe ratio reaches 2.0 atom % or higher. Meanwhile, from the viewpoint of magnetic characteristics, the ratio of hexagonal ferrite which is a magnetic portion to particles is preferably higher. Therefore, the metal/Fe ratio is preferably 20 atom % or lower and more preferably 15 atom % or lower. The mixing ratio between the crystalline metal oxide precursor and the hexagonal ferrite magnetic particles is desirably determined so that the above-described preferred amount of the crystalline metal oxide is adhered to the surfaces of the hexagonal ferrite magnetic particles. In addition, in order to cause the reaction to favorable proceed, the amount of the hexagonal ferrite magnetic particles in the water-based solution is preferably set in a range of approximately 0.01 parts by mass to 10 parts by mass per 100 parts by mass of the solvent.

In order to suppress aggregation of the hexagonal ferrite magnetic particles during the reaction and adhere the crystalline metal oxide to the fine particles, it is also preferable to add the above-described organic modifier to the solution including the hexagonal ferrite magnetic particles and the crystalline metal oxide precursor. The organic modifier may be added to the solution including the hexagonal ferrite magnetic particles and the crystalline metal oxide precursor without any changes, but is preferably added thereto in a form of a solution including the organic modifier in an organic solvent (an organic modifier solution) since, then, the crystalline metal oxide is adhered to fine hexagonal ferrite magnetic particles. For example, the solution including the hexagonal ferrite magnetic particles and the crystalline metal oxide precursor and the organic modifier solution can be mixed together by introducing the organic modifier solution into the liquid tank 3 in the production apparatus illustrated in FIG. 1 and joining the pipe 102 to the pipe 101. Details of the specific examples and preferred used amount of the organic modifier and the organic solvent available for the organic modifier solution are as described above.

Specific aspects of a step of converting the crystalline metal oxide precursor to the crystalline metal oxide and precipitating the crystalline metal oxide on the surfaces of the hexagonal ferrite magnetic particles include the following aspects.

(3) A water-based solution which includes the hexagonal ferrite magnetic particles and the crystalline metal oxide precursor and arbitrarily includes the organic modifier is continuously fed into a reaction flow path in which a fluid flowing in the reaction flow path is heated at 350° C. or higher and is pressurized by applying a pressure of 20 MPa or higher to the fluid, thereby converting the crystalline metal oxide precursor to the crystalline metal oxide in the reaction flow path.

(4) A water-based solution including the hexagonal ferrite magnetic particles and the crystalline metal oxide precursor and arbitrarily including the organic modifier is added to a liquid-feeding path into which water heated at 350° C. or higher and pressurized at a pressure of 20 MPa or higher is continuously fed, and a liquid mixture of the water and the water-based solution is continuously fed into the liquid-feeding path while being heated at 350° C. or higher and pressurized at a pressure of 20 MPa or higher, thereby converting the crystalline metal oxide precursor to the crystalline metal oxide.

The aspects (3) and (4) are steps similar to the above-described aspects (1) and (2), respectively. The aspect (4) is different from the aspect (3) since the water in a subcritical to supercritical state and the water-based solution including the crystalline metal oxide precursor together with the hexagonal ferrite magnetic particles are brought into contact with each other while the water-based solution including the crystalline metal oxide precursor together with the hexagonal ferrite magnetic particles is heated and pressurized in order to put the water-based solution into a subcritical to supercritical state in the aspect (3). In the aspect (4), since the water-based solution is brought into contact with the water in a subcritical to supercritical state, the crystalline metal oxide precursor is instantly put into a highly reactive state and thus is converted to the crystalline metal oxide in an early stage, which is advantageous.

For example, in the production apparatus illustrated in FIG. 1, in the mixing section M1, water in a subcritical to supercritical state and the water-based solution which includes the crystalline metal oxide precursor together with the hexagonal ferrite magnetic particles and arbitrarily includes the organic modifier are mixed together, and the liquid mixture is heated and pressurized in the reactor 6, whereby the crystalline metal oxide precursor is converted to the crystalline metal oxide, and the crystalline metal oxide is precipitated on the surfaces of the hexagonal ferrite magnetic particles. Therefore, hexagonal ferrite magnetic particles having the crystalline metal oxide adhered to a surface thereof can be obtained.

In addition, specific aspects of the continuous hydrothermal synthesis process are as described above.

The hexagonal ferrite magnetic powder for magnetic recording according to an aspect of the present invention is preferably made of hexagonal ferrite magnetic particles having the crystalline metal oxide adhered to a surface thereof which are obtained using the above-described production method. However, as described above, the hexagonal ferrite magnetic powder for magnetic recording according to an aspect of the present invention is not limited to powder obtained using the above-described production method.

From the viewpoint of satisfying both high-density recording and favorable electromagnetic conversion characteristics, as ferromagnetic powder in the magnetic layer, fine particles of a magnetic body are preferably used. Therefore, the hexagonal ferrite magnetic particles constituting the hexagonal ferrite magnetic powder for magnetic recording according to an aspect of the present invention are preferably fine particles. In more detail, the activation volume is preferably 1600 $nm^3$ or smaller, more preferably 1500 $nm^3$ or smaller, and still more preferably 1400 $nm^3$ or smaller. On the other hand, from the viewpoint of the stability of magnetization, the activation volume is preferably 800 $nm^3$ or larger, more preferably 900 $nm^3$ or larger, and still more preferably 1000 $nm^3$ or larger. As a method for obtaining the above-described fine hexagonal ferrite magnetic particles having the crystalline metal oxide adhered to a surface thereof, the above-described production method is preferred.

The hexagonal ferrite magnetic particles described thus far are capable of having a core/shell structure in which hexagonal ferrite forms the core and a coating of the crystalline metal oxide forms the shell. The shell may be a continuous phase or may be present on the core as a discontinuous phase having a so-called sea-island structure so as to have some uncoated portions. When the crystalline metal oxide is present on the surface of hexagonal ferrite as the above-described shell, it becomes possible to provide a magnetic recording medium having high coated film durability. This fact is a finding newly found by the present inventors.

[Magnetic Recording Medium]

An aspect of the present invention relates to a magnetic recording medium having a magnetic layer including ferromagnetic powder and a binder on a non-magnetic support body, in which the ferromagnetic powder is the above-described hexagonal ferrite magnetic powder for magnetic recording.

As described above, when the above-described hexagonal ferrite magnetic powder for magnetic recording is used as the ferromagnetic powder in the magnetic layer, it is possible to provide a magnetic recording medium having high coated film durability.

Magnetic Layer

Details of the hexagonal ferrite magnetic powder for magnetic recording which is ferromagnetic powder used for the magnetic layer and the method for producing the same are as described above.

The magnetic layer includes a binder together with ferromagnetic powder. As the binder in the magnetic layer, it is possible to use one of a polyurethane resin, a polyester-based resin, a polyamide-based resin, a vinyl chloride-based resin, an acrylic resin with which styrene, acrylonitrile, methyl methacrylate, or the like is copolymerized, a cellulose-based resin such as nitrocellulose, an epoxy resin, a phenoxy resin, a polyvinyl alkyral resin such as polyvinyl acetal or polyvinyl butyral, and the like or a mixture of a plurality of resins therefrom. Among these, a polyurethane resin, an acrylic resin, a cellulose-based resin, and a vinyl chloride-based resin are preferred. These resins can also be used as a binder in a non-magnetic layer described below. Regarding the above-described binders, Paragraphs "0029" to "0031" of JP2010-24113A can be referred to. In addition, it is also possible to use a polyisocyanate-based curing agent together with the resin.

An additive can be added to the magnetic layer as necessary. Examples of the additive include an abrasive, a lubricant, a dispersing agent and dispersing aid, an anti-mold agent, an antistatic agent, an antioxidant, a solvent, carbon black, and the like. As the above-described additives, commercially available products can be appropriately selected and used depending on desired properties.

Non-Magnetic Layer

Next, the non-magnetic layer will be described in detail. The magnetic recording medium according to an aspect of the present invention may have a non-magnetic layer including non-magnetic powder and the binder between the non-magnetic support body and the magnetic layer. The non-magnetic powder used in the non-magnetic layer may be an inorganic substance or an organic substance. In addition, carbon black and the like can also be used. Examples of the inorganic substance include metals, metal oxides, metal carbonates, metal sulfates, metal nitrides, metal carbides, metal sulfides, and the like. These non-magnetic powders can be produced from commercially available products or can be produced using a well-known method. Regarding details thereof, Paragraphs "0036" to "0039" of JP2010-24113A can be referred to.

As the binder, the lubricant, the dispersing agent, the additives, the solvent, the dispersion method, and the like for the non-magnetic layer, those for the magnetic layer can be applied. Particularly, regarding the amount and kind of the binder, the added amounts and kinds of the additives and the dispersing agent, well-known techniques regarding the magnetic layer can be applied. In addition, carbon black or organic powder can also be added to the non-magnetic layer. Regarding these, for example, Paragraphs "0040" to "0042" of JP2010-24113A can be referred to.

Non-Magnetic Support Body

Examples of the non-magnetic support body include well-known support bodies such as biaxially-stretched polyethylene terephthalate, polyethylene naphthalate, polyamide, polyamideimide, and aromatic polyamide. Among these, polyethylene terephthalate, polyethylene naphthalate, and polyamide are preferred.

These support bodies may be subjected to corona discharge, a plasma treatment, an easy-adhesion treatment, a thermal treatment, or the like in advance. In addition, regarding the surface roughness of the non-magnetic support body that can be used in the present invention, the central average roughness at a cut-off value of 0.25 mm is preferably in a range of 3 nm to 10 nm.

Layer Constitution

Regarding the thickness constitution of the magnetic recording medium according to an aspect of the present invention, the thickness of the non-magnetic support body is preferably in a range of 3 µm to 80 µm. The thickness of the magnetic layer is optimized depending on the saturated magnetization amount of a magnetic head being used, the length of a head gap, and the bandwidth of a recording signal and is generally in a range of 0.01 µm to 0.15 µm, preferably in a range of 0.02 µm to 0.12 µm, and more preferably in a range of 0.03 µm to 0.10 µm. Only one magnetic layer may be provided or two or more magnetic layers having different magnetic characteristics may be separately provided, and the constitutions of a well-known multi-layered magnetic layer can be applied.

The thickness of the non-magnetic layer is, for example, in a range of 0.1 µm to 3.0 µm, preferably in a range of 0.3 µm to 2.0 µm, and more preferably in a range of 0.5 µm to 1.5 µm. Meanwhile, the non-magnetic layer in the magnetic recording medium according to an aspect of the present invention exhibits effects thereof as long as the non-magnetic layer is substantially non-magnetic. For example, even a layer including a small amount of a magnetic body as an impurity or intentionally is capable of exhibiting the effects of the present invention and thus can be considered as substantially the same constitution as that of the magnetic recording medium according to an aspect of the present invention. Here, "being substantially the same" means that the residual magnetic flux density of the non-magnetic layer is 10 mT or lower or the coercive force is 7.96 kA/m (1000 e) or lower, and preferably, the constitution has neither the residual magnetic flux density nor the coercive force.

Backcoat Layer

In the magnetic recording medium, it is also possible to provide a backcoat layer on a surface opposite to a surface having the magnetic layer of the non-magnetic support body. The backcoat layer preferably includes carbon black and inorganic powder. Regarding a binder and a variety of additives for forming the backcoat layer, the formulations of the magnetic layer or the non-magnetic layer can be applied. The thickness of the backcoat layer is preferably 0.9 µm or less and more preferably in a range of 0.1 µm to 0.7 µm.

Production Method

A step of producing a coating fluid for forming the magnetic layer, the non-magnetic layer, or the backcoat layer is generally made of at least a kneading step, a dispersion step, and mixing steps provided as necessary before and after the above-described steps. Each of the respective steps may be separated into two or more stages. All raw materials used in the present invention such as the ferromagnetic powder, the non-magnetic powder, the binder, the carbon black, the abrasive, the antistatic agent, the lubricant, and the solvent may be added in the beginning or middle of any step. In addition, the respective raw materials may be separately added in two or more steps. For example, polyurethane may be separately injected in the kneading step, the dispersion step, and the mixing step for adjusting the viscosity to be a desired value after dispersion. In order to achieve the object of the present invention, a well-known production technique of the related art can be used as one of the steps. In the kneading step, a kneading machine having a strong kneading force such as an open kneader, a continuous kneader, a dispersion kneader, or an extruder is preferably used. Details of this kneading treatment are described in JP1989-106338A (JP-H1-106338A) and JP1989-79274A (JP-H1-79274A). In addition, in order to disperse a magnetic layer coating fluid, a non-magnetic layer coating fluid, or a backcoat layer coating fluid, glass beads can be used. As the above-described glass beads, zirconia beads, titania beads, or steel beads which are dispersion media having a high specific gravity are preferred. These dispersion media are used after optimizing the particle diameters and the filling fraction thereof. As a dispersing device, a well-known dispersing device can be used. Regarding details of the method for producing the magnetic recording medium, for example, Paragraphs "0051" to "0057" of JP2010-24113A can be referred to.

The magnetic recording medium according to an aspect of the present invention described above is capable of exhibiting high coated film durability when including the above-described hexagonal ferrite magnetic powder for magnetic recording in the magnetic layer, and thus the magnetic recording medium is preferable as a magnetic recording medium for high-density recording required to be capable of playing records with high reliability for a long period of time.

EXAMPLES

Hereinafter, the present invention will be more specifically described using examples. However, the present invention is not limited to aspects described in the examples. "Parts" described below indicates "parts by mass". In addition, the following steps and evaluations are carried out at 23° C.±1° C. in the atmosphere unless particularly otherwise described.

An X-ray diffraction analysis below was carried out by applying CuKα rays under conditions of 40 kV and 45 mA and measuring an XRD pattern. An X-ray powder diffraction spectrum was measured under the following experimental conditions:

PANalytical X'Pert Pro diffractometer, PIXcel detector

Voltage: 45 kV, intensity: 40 mA

Soller slits of incident beam and diffraction beam: 0.017 radians

Fixation angle of dispersion slit: ¼ degrees

Mask: 10 mm

Scattering prevention slit: ¼ degrees

Measurement mode: continuous

Measurement duration per stage: 3 seconds

Measurement speed: 0.017 degrees per second

Measurement step: 0.05 degrees

1. Examples and Comparative Examples Regarding Hexagonal Ferrite Magnetic Powder for Magnetic Recording Example 1-1

(Preparation of Core Particles Using Glass Crystallization Method)

1481 g of $BaCO_3$, 666 g of $H_3BO_3$, 1115 g of $Fe_2O_3$, and 17.6 g of $Nb_2O_5$ were weighed and mixed using a mixer, thereby obtaining a raw material mixture.

The obtained raw material mixture was dissolved in a platinum crucible having a capacity of 1 L, a tap hole provided in the bottom of the platinum crucible was heated while stirring the raw material mixture at 1380° C., and the molten liquid was tapped in a rod shape at approximately 6 g/sec. The tapped liquid was quenched and rolled using a water-cooling twin roll, thereby producing an amorphous substance.

280 g of the obtained amorphous body was put into an electrical furnace and was held at 650° C. (crystallization temperature) for five hours, thereby precipitating (crystallizing) ferromagnetic hexagonal barium ferrite particles.

Next, a crystallized substance including the ferromagnetic hexagonal barium ferrite particles was coarsely crushed using a mortar, 1000 g of 1 mm φ zirconia beads and 800 ml of acetic acid having a concentration of 1% were added to a 2000 ml glass bottle, a dispersion treatment was carried out for three hours using a paint shaker, and then a dispersion liquid was separated from the beads and was put into a 3 L stainless beaker. The dispersion liquid was treated at 100° C. for three hours, was precipitated using a centrifugal separator, was washed by repeating decantation, and was dried at 110° C. for six hours, thereby obtaining particles. An X-ray diffraction analysis was carried out on the obtained particles, and the particles are confirmed to be hexagonal ferrite (barium ferrite).

(Attachment of Crystalline Alumina Shell Using Supercritical Synthesis Method)

In order to educe crystalline $Al_2O_3$ on the surfaces of the barium ferrite particles obtained using the above-described method using a supercritical synthesis method, the following operations were carried out.

Aluminum nitrate nonahydrate (purity: 99.9%) was dissolved in purified water so as to reach 0.1 M, and the barium ferrite particles were mixed with aluminum nitrate nonahydrate so that the Al/Fe ratio reached 4 atom %, thereby obtaining a raw material mixed liquid.

Next, oleic acid was dissolved in ethanol so as to reach 0.2 M, thereby preparing a modifier solution.

The raw material mixture and the modifier solution were introduced into the liquid tank 2 and the liquid tank 3 in the production apparatus illustrated in FIG. 1, respectively. Meanwhile, as the pipes in the production apparatus, SUS316BA tubes were used.

The purified water introduced into the liquid tank 1 was heated using a heater 4 while being fed using the high-pressure pump 5a, thereby circulating high-temperature-and-pressure water in the pipe 100. At this time, the temperature and the pressure were controlled so that the temperature and pressure of the high-temperature-and-pressure water after passing the heating means 4c reached 450° C. and 30 MPa, respectively.

Meanwhile, the raw material mixed liquid and the modifier solution were fed into the pipes 101 and 102, respectively, at 25° C. using individual high-pressure pumps 5b and 5c so that the ratio between the raw material mixed liquid and the modifier solution reached 50:50 in terms of volume ratio, and both liquids were mixed together in the middle. Here, in the obtained mixed liquid, the volume ratio of water to ethanol was 75/25, and the pH (25° C.) was 12.0. This mixed liquid was mixed with the high-temperature-and-pressure water in the mixing section M1, and subsequently, was heated and pressurized at 450° C. and 30 MPa for 10 seconds in the reactor 6, thereby obtaining barium ferrite particles coated with crystalline $Al_2O_3$. A liquid including the obtained particles was cooled using cold water in the cooling section 7, and the particles were collected.

The collected particles were washed with ethanol and separated. As a result of an XRD analysis (X-ray diffraction analysis), not only a diffraction peak of barium ferrite but also a peak of γ-type $Al_2O_3$ (alumina) were confirmed. Meanwhile, barium ferrite not including any substitution elements is indicated as $BaFe_{12}O_{19}$. In the present example, since Nb was included as a substitution element for Fe, in the obtained barium ferrite, some Fe in the above-described formula is substituted with Nb.

Example 1-2

Particles were obtained in the same manner as in Example 1 except for the fact that cerium hydroxide $Ce(OH)_4$ was used instead of aluminum nitrate nonahydrate.

As a result of an XRD analysis of the obtained particles, not only a diffraction peak of barium ferrite but also a peak of $CeO_2$ (ceria) were confirmed.

Example 1-3

Particles were obtained in the same manner as in Example 1 except for the fact that zirconium acetate $Zr(CH_3COO)_4$ was used instead of aluminum nitrate nonahydrate.

As a result of an XRD analysis of the obtained particles, not only a diffraction peak of barium ferrite but also a peak of $ZrO_2$ (zirconia) were confirmed.

Comparative Example 1-1

Particles were obtained in the same manner as in Example 1-1 except for the fact that, in the preparation of the core particles using the glass crystallization method, 74.2 g of $Al(OH)_3$ was mixed into the raw material mixture and the treatment for attaching the shell was not carried out.

As a result of an XRD analysis of the obtained particles, only a diffraction peak of barium ferrite was confirmed.

Comparative Example 1-2

Particles were obtained in the same manner as in Comparative Example 1-1 except for the fact that, in the preparation of the core particles using the glass crystallization method, the dispersion liquid was dried at 420° C. for five hours instead of being dried at 110° C. for six hours after the repetitive washing.

As a result of an XRD analysis of the obtained particles, only a diffraction peak of barium ferrite was confirmed.

Example 1-4

Particles were obtained in the same manner as in Example 1 except for the fact that, in the preparation of the core particles using the glass crystallization method, barium carbonate was substituted with strontium carbonate.

As a result of an XRD analysis of the obtained particles, not only a diffraction peak of barium ferrite but also a peak of γ-type $Al_2O_3$ were confirmed. Meanwhile, strontium ferrite not including any substitution elements is indicated as $SrFe_{12}O_{19}$. In the present example, since Nb was included as a substitution element for Fe, in the obtained strontium ferrite, some Fe in the above-described formula is substituted with Nb.

Examples 1-5 to 1-9, 1-11, and 1-12

Particles were obtained in the same manner as in Example 1 except for the fact that, in the preparation of the core particles using the glass crystallization method, the crystallization temperature was set to temperatures shown in Table 1.

As a result of an XRD analysis of the obtained particles, not only a diffraction peak of barium ferrite but also a peak of γ-type $Al_2O_3$ were confirmed.

Example 1-10

Particles were obtained in the same manner as in Example 1 except for the fact that the core particles were prepared using the following supercritical synthesis method.

An aqueous solution (sol) including a metal salt and a metal hydroxide was prepared by dissolving barium hydroxide $(Ba(OH)_2 \cdot 8H_2O)$, iron nitrate (III) $(Fe(NO_3)_3 \cdot 9H_2O)$, and KOH. The concentration of the prepared aqueous solution (sol) was 0.01 M, and the Ba/Fe molar ratio was 0.5.

Next, oleic acid was dissolved in ethanol, thereby preparing a modifier solution. The concentration of the prepared solution was 0.2 M.

The aqueous solution (sol) and the modifier solution were respectively introduced into the liquid tank 2 and the liquid tank 3 in the production apparatus illustrated in FIG. 1. Meanwhile, as the pipes in the production apparatus, SUS316BA tubes were used.

The purified water introduced into the liquid tank 1 was heated using the heater 4 while being fed using the high-pressure pump 5a, thereby circulating high-temperature-and-pressure water in the pipe 100. At this time, the temperature and the pressure were controlled so that the temperature and pressure of the high-temperature-and-pressure water after passing the heating means 4c reached 450° C. and 30 MPa, respectively.

Meanwhile, the aqueous solution (sol) and the modifier solution were fed into the pipes 101 and 102, respectively, at 25° C. using the respective high-pressure pumps 5b and 5c so that the ratio between the aqueous solution and the modifier solution reached 5:5 in terms of volume ratio, and both liquids were mixed together in the middle. Here, in the obtained mixed liquid, the volume ratio of water to ethanol was 75/25, and the pH (25° C.) was 12.0. This mixed liquid was mixed with the high-temperature-and-pressure water in the mixing section M1, and subsequently, was heated and pressurized at 400° C. and 30 MPa in the reactor 6, thereby synthesizing barium ferrite nanoparticles.

After the synthesis of the barium ferrite nanoparticles, a liquid including the barium ferrite nanoparticles was cooled using cold water in the cooling section 7, and the particles were collected.

The collected particles were washed with ethanol and, subsequently, centrifugally separated, thereby separating barium ferrite nanoparticles modified with oleic acid.

For each of the magnetic powders obtained in the above-described examples, 0.01 g of the magnetic powder was immersed in 10 mL of a 4N—HCl solution and was heated on a hot plate at 80° C. for three hours, thereby being dissolved. The solution was diluted, and then the weights of Fe and the metal (Al, Ce, or Zr) were measured through ICP, thereby obtaining a metal/Fe ratio. The metal/Fe ratios were all approximately 4 atom %.

The activation volumes of the respective particles obtained in the examples and the comparative examples were obtained using the following method.

The magnetic field sweeping rate in an He measurement section was measured using a vibrating sample magnetometer (manufactured by Tohei Industrial Co., Ltd.) at 3 minutes and 30 minutes, and the activation volume V was computed from the following relational expression between thermal fluctuation-caused Hc and magnetization reversal volume.

$$Hc = (2Ku/Ms) * \{1 - [(kT/KuV)\ln(At/0.693)]^{(1/2)}\}$$

[In the above expression, Ku: anisotropy constant, Ms: saturated magnetization, k: Boltzmann constant, T: absolute temperature, V: activation volume A: spin precession frequency, t: magnetic reversal time]

Details of the examples and the comparative examples were shown in Table 1 below.

Methyl ethyl ketone: 180 parts
Cyclohexanone: 100 parts
(2) Formulation of Non-Magnetic Layer Coating Fluid
Non-magnetic body α iron oxide: 100 parts
Average primary particle diameter 0.09 μm
Specific surface area measured using a BET method 50 m$^2$/g
pH 7
DBP oil absorption 27 g/100 g to 38 g/100 g
Surface treatment agent $Al_2O_3$ 8% by mass
Carbon black (CONDUCTEX SC-U manufactured by Columbia Carbon Corporation): 25 parts
Vinyl chloride copolymer (MR104 manufactured by Zeon Corporation): 13 parts
Polyurethane resin (UR8200 manufactured by Toyobo Co., Ltd.): 5 parts
Phenylphosphonic acid: 3.5 parts
Butyl stearate: 1 part
Stearic acid: 2 parts
Methyl ethyl ketone: 205 parts
Cyclohexanone: 135 parts
(3) Production of Magnetic Tape For each of the respective coating fluids, the respective components were kneaded together using a kneader. The fluids were made to flow into a horizontal sand mill includ-

TABLE 1

| | Core portion | Shell portion | Crystalline phase | Method for producing core particles | Crystallization temperature of core particles | Activation volume |
|---|---|---|---|---|---|---|
| Example 1-1 | Barium ferrite | Alumina | Barium ferrite, γ-$Al_2O_3$ | Glass crystallization method | 650° C. | 1260 nm$^3$ |
| Example 1-2 | Barium ferrite | Ceria | Barium ferrite, $CeO_2$ | Glass crystallization method | 650° C. | 1260 nm$^3$ |
| Example 1-3 | Barium ferrite | Zirconia | Barium ferrite, $ZrO_2$ | Glass crystallization method | 650° C. | 1260 nm$^3$ |
| Comparative Example 1-1 | Barium ferrite | Alumina | Barium ferrite alone | Glass crystallization method | 650° C. | 1230 nm$^3$ |
| Comparative Example 1-2 | Barium ferrite | Alumina | Barium ferrite alone | Glass crystallization method | 650° C. | 1830 nm$^3$ |
| Example 1-4 | Strontium ferrite | Alumina | Strontium ferrite, γ-$Al_2O_3$ | Glass crystallization method | 650° C. | 1150 nm$^3$ |
| Example 1-5 | Barium ferrite | Alumina | Barium ferrite, γ-$Al_2O_3$ | Glass crystallization method | 670° C. | 1350 nm$^3$ |
| Example 1-6 | Barium ferrite | Alumina | Barium ferrite, γ-$Al_2O_3$ | Glass crystallization method | 700° C. | 1430 nm$^3$ |
| Example 1-7 | Barium ferrite | Alumina | Barium ferrite, γ-$Al_2O_3$ | Glass crystallization method | 580° C. | 850 nm$^3$ |
| Example 1-8 | Barium ferrite | Alumina | Barium ferrite, γ-$Al_2O_3$ | Glass crystallization method | 590° C. | 930 nm$^3$ |
| Example 1-9 | Barium ferrite | Alumina | Barium ferrite, γ-$Al_2O_3$ | Glass crystallization method | 600° C. | 1100 nm$^3$ |
| Example 1-10 | Barium ferrite | Alumina | Barium ferrite, γ-$Al_2O_3$ | Supercritical synthesis method | — | 1050 nm$^3$ |
| Example 1-11 | Barium ferrite | Alumina | Barium ferrite, γ-$Al_2O_3$ | Glass crystallization method | 710° C. | 1620 nm$^3$ |
| Example 1-12 | Barium ferrite | Alumina | Barium ferrite, γ-$Al_2O_3$ | Glass crystallization method | 570° C. | 780 nm$^3$ |

2. Examples and Comparative Examples Regarding Magnetic Recording Medium (Magnetic Tape)

Examples 2-1 to 2-12 and Comparative Examples 2-1 and 2-2

(1) Formulation of Magnetic Layer Coating Fluid
Hexagonal ferrite magnetic powder (shown in Table 2): 100 parts
Polyurethane resin: 12 parts
Mass-average molecular weight 10000
Amount of sulfonic acid functional group contained 0.5 meq/g
Diamond fine particles (average particle diameter 50 nm): 2 parts
Carbon black (#55 manufactured by Asahi Carbon Co., Ltd., particle size 0.015 μm): 0.5 parts
Stearic acid: 0.5 parts
Butyl stearate: 2 parts ing the amount of 1.0 mm φ zirconia beads so as to fill 65% of the volume of a dispersion section using a pump and were dispersed at 2000 rpm for 120 minutes (a substantial retention time in the dispersion section). To the dispersion liquid obtained, 6.5 parts of polyisocyanate were added in the case of the coating fluid for the non-magnetic layer, followed by 7 parts of methyl ethyl ketone. The dispersion liquid was then filtered using a filter having an average pore diameter of 1 μm, thereby preparing a coating fluid for forming the non-magnetic layer and a coating fluid for forming the magnetic layer, respectively.

After the obtained non-magnetic layer coating fluid was applied to and dried on a 5 μm-thick polyethylene naphthalate base so that the thickness of the dried coating reached 1.0 μm, sequential multilayer coating was carried out so that the thickness of the magnetic layer reached 70 nm, and, after the drying, a treatment was carried out at a temperature of 90° C. and a linear pressure of 300 kg/cm using a 7-stage calender. The magnetic layer was slit into quarter-inch strips, and a surface polishing treatment was carried out, thereby obtaining magnetic tape.

(4) Evaluation of Magnetic Tape

The magnetic tape was evaluated using the following method.

<Coated Film Durability (Abrasion Resistance (Alumina Abrasion)>

The tape surface was rubbed with an alumina ball having a diameter of 4 mm 20 times in a 23° C. and 10% RH environment at a load of 20 g, then, the surface of the tape specimen was observed using an optical microscope (200 times), and the coated film durability was evaluated using the following standards.

A . . . No scratches were observed on the specimen surface in the view of the optical microscope.

B . . . One to five scratches were observed on the specimen surface in the view of the optical microscope.

C . . . Six to ten scratches were observed on the specimen surface in the view of the optical microscope.

D . . . More than 10 to 50 scratches were observed on the specimen surface in the view of the optical microscope.

E . . . More than 50 scratches were observed on the specimen surface in the view of the optical microscope.

<SNR>

For each magnetic tape, a recording head (MIG, gap: 0.15 μm, 1.8 T) and a GMR head for playing were attached to a drum tester, and a signal having a track density of 16 KTPI and a linear recording density of 400 Kbpi (surface recording density of 6.4 Gbpsi) was recorded and played, thereby obtaining a ratio between a playing signal and noise (SNR).

The above-described results are shown in Table 2 below.

TABLE 2

|  | Ferromagnetic powder | SNR | Abrasion resistance |
|---|---|---|---|
| Example 2-1 | Example 1-1 | +1.3 dB | A |
| Example 2-2 | Example 1-2 | +0.9 dB | B |
| Example 2-3 | Example 1-3 | +0.8 dB | B |
| Comparative Example 2-1 | Comparative Example 1-1 | 0.0 dB | E |
| Comparative Example 2-2 | Comparative Example 1-2 | −0.8 dB | E |
| Example 2-4 | Example 1-4 | +2.0 dB | A |
| Example 2-5 | Example 1-5 | +0.8 dB | A |
| Example 2-6 | Example 1-6 | +0.7 dB | A |
| Example 2-7 | Example 1-7 | +0.9 dB | A |
| Example 2-8 | Example 1-8 | +1.0 dB | A |
| Example 2-9 | Example 1-9 | +1.8 dB | A |
| Example 2-10 | Example 1-10 | +3.0 dB | A |
| Example 2-11 | Example 1-11 | −0.3 dB | A |
| Example 2-12 | Example 1-12 | −0.5 dB | B |

Examples 2-1 to 2-12 were examples in which magnetic particles in which the surfaces of hexagonal ferrite magnetic particles (core particles) were coated with a shell of crystalline alumina, ceria, or zirconia were used as ferromagnetic powder for the magnetic layer and exhibited favorable results in the evaluation of the abrasion resistance. Among these, Examples 2-1 to 2-3 were compared with each other, and it was confirmed that, when crystalline alumina was formed as a shell, more favorable abrasion resistance (coated film durability) could be obtained.

Comparative Examples 2-1 and 2-2 are examples in which magnetic particles having an Al-containing adhered substance formed on the particle surface using the glass crystallization method were used as ferromagnetic powder for the magnetic layer. From the magnetic particles used in Comparative Example 2-1 (Comparative Example 1-1), no peak of alumina was detected in the XRD analysis thereof, and thus it was confirmed that the Al-containing adhered substance on the surface was not present as a crystalline phase. While the magnetic particles used in Comparative Example 2-2 (Comparative Example 1-2) were about an example in which the drying temperature was increased in order to crystallize the Al-containing adhered substance on the surface, since no peak of alumina was detected in the XRD analysis thereof, it was confirmed that no crystalline alumina was present on the surface. This is considered to be because, consequently, Al diffused into the lattices of barium ferrite in spite of the increase in the drying temperature. In addition, due to the drying at a high temperature, some particles were joined together, and thus the activation volume of the obtained magnetic particles became great. Therefore, the abrasion resistance did not improve, and SNR was also low.

Example 2-4 was an example in which magnetic particles (Example 1-4) including strontium ferrite as the core particles were used, SNR was high, and the abrasion resistance was also excellent.

Examples 2-5 to 2-9, 2-11, and 2-12 were examples in which the activation volumes were changed by changing the crystallization temperature of the barium ferrite particles which were the core particles. In Examples 2-5 to 2-9 in which the activation volumes were in a range of 800 nm³ to 1600 nm³, favorable SNRs could be obtained compared with Examples 2-11 and 2-12.

Example 2-10 was an example in which magnetic particles (Example 1-10) in which barium ferrite obtained using the supercritical synthesis method was used as the core particles were used, the abrasion resistance was favorable, and furthermore, SNR was significantly high compared with the examples in which magnetic particles obtained using the glass crystallization method were used.

The present invention is useful in a field of producing a magnetic recording medium for high-density recording such as backup tape.

What is claimed is:

1. Hexagonal ferrite magnetic powder for magnetic recording, which is comprised of hexagonal ferrite magnetic particles having a crystalline metal oxide adhered to a surface thereof,
    wherein the activation volume is in a range of 800 nm³ to 1600 nm³, and the crystalline metal oxide is a crystalline oxide of a metal selected from the group consisting of Al, Zr, and Ce.

2. The hexagonal ferrite magnetic powder for magnetic recording according to claim 1,
    wherein the hexagonal ferrite magnetic particles are hexagonal ferrite magnetic particles having a crystalline metal oxide adhered to the surface thereof in which the amount of the metal falls within a range of 0.5 atom % to 20 atom % with respect to 100 atom % of Fe.

3. The hexagonal ferrite magnetic powder for magnetic recording according to claim 1,
    wherein the hexagonal ferrite magnetic particles are barium ferrite magnetic particles.

4. The hexagonal ferrite magnetic powder for magnetic recording according to claim 1,
    wherein the hexagonal ferrite magnetic particles are strontium ferrite magnetic particles.

5. A magnetic recording medium having a magnetic layer including ferromagnetic powder and a binder on a non-magnetic support body, wherein the ferromagnetic powder is hexagonal ferrite magnetic powder for magnetic recording, which is comprised of hexagonal ferrite magnetic particles having a crystalline metal oxide adhered to a surface thereof, the hexagonal ferrite magnetic powder for magnetic recording has an activation volume in a range of 800 nm$^3$ to 1600 nm$^3$, and the crystalline metal oxide is a crystalline oxide of a metal selected from the group consisting of Al, Zr, and Ce.

6. The magnetic recording medium according to claim 5, wherein the hexagonal ferrite magnetic particles are hexagonal ferrite magnetic particles having a crystalline metal oxide adhered to the surface thereof in which the amount of the metal falls within a range of 0.5 atom % to 20 atom % with respect to 100 atom % of Fe.

7. The magnetic recording medium according to claim 5, wherein the hexagonal ferrite magnetic particles are barium ferrite magnetic particles.

8. The magnetic recording medium according to claim 5, wherein the hexagonal ferrite magnetic particles are strontium ferrite magnetic particles.

\* \* \* \* \*